US011068602B2

(12) United States Patent
Hong

(10) Patent No.: US 11,068,602 B2
(45) Date of Patent: Jul. 20, 2021

(54) SERVER AND METHOD FOR CHECKING VULNERABILITY OF MOBILE APPLICATION

(71) Applicant: M-SECURE CO., LTD., Seoul (KR)

(72) Inventor: Dongcheol Hong, Seoul (KR)

(73) Assignee: M-SECURE CO., LTD., Seoul (KR)

( * ) Notice: Subject to any disclaimer, the term of this patent is extended or adjusted under 35 U.S.C. 154(b) by 180 days.

(21) Appl. No.: 16/174,886

(22) Filed: Oct. 30, 2018

(65) Prior Publication Data
US 2019/0138732 A1 May 9, 2019

(30) Foreign Application Priority Data

Nov. 6, 2017 (KR) .................. 10-2017-0146605

(51) Int. Cl.
G06F 21/57 (2013.01)
G06F 11/36 (2006.01)
H04W 12/30 (2021.01)

(52) U.S. Cl.
CPC ........ G06F 21/577 (2013.01); G06F 11/3688 (2013.01); H04W 12/30 (2021.01); G06F 2221/033 (2013.01)

(58) Field of Classification Search
CPC ............... G06F 11/3688; G06F 21/577; G06F 2221/033; G06F 15/78; G06F 11/1612; G06F 13/122; G06F 16/00; G06F 2003/0691; G06F 3/0601; G06F 5/06; G06F 5/065; G06F 9/30; G06F 9/30032; G06F 9/30094; G06F 9/30145; G06F 9/4484; G06F 11/0721; G06F 11/0748; G06F 11/0769; G06F 11/0772; G06F 11/3604; G06F 11/3664; G06F 11/3684; G06F 2003/0698; G06F 3/06; G06F 7/5272; G06F 8/53; G06F 8/75; G06F 9/30181; G06F 9/32; G06F 21/14; H04W 12/002; H04W 12/30; G07F 9/00; G07F 9/006

See application file for complete search history.

(56) References Cited

U.S. PATENT DOCUMENTS 9,946,880 B2  4/2018 Lee et al.
2012/0159434 A1* 6/2012 Dang ................. G06F 8/36
                                                  717/120
2012/0317647 A1* 12/2012 Brumley ........... G06F 21/563
                                                  726/25
2017/0270319 A1* 9/2017 Salmon-Legagneur ......................
                                                  G06F 21/645
2018/0150288 A1* 5/2018 Shantharam ........... H04L 67/34

FOREIGN PATENT DOCUMENTS

JP      2017117309 A    6/2017
KR      20140110520 A   9/2014
KR      101568224 B1   11/2015

* cited by examiner

Primary Examiner — Abiy Getachew
(74) Attorney, Agent, or Firm — Osha Bergman Watanabe & Burton LLP

(57) ABSTRACT

Provided are a server and method for checking a vulnerability of a mobile application. The method includes (a) receiving a target execution file whose vulnerabilities will be checked and which corresponds to a mobile application to be executed in a mobile terminal, (b) testing vulnerabilities of the target execution file according to a type of an operating system of the target execution file, and (c) generating results of analyzing vulnerabilities of the target execution file on the basis of results of checking vulnerabilities of the target execution file.

11 Claims, 10 Drawing Sheets

FIG. 6

```
.class public Lcom/example/testproject/MainActivity;
.super Landroid/app/Activity;
.source "MainActivity.java"

# interfaces
.implements Landroid/view/View$OnClickListener;

# instance fields
.field private btn:Landroid/widget/Button;

.field private count:I

.field private text:Landroid/widget/TextView;

# direct methods
.method public constructor <init>()V
    .locals 1

.prologue
    const/4 v0, 0x0

.line 19
    invoke-direct {p0}, Landroid/app/Activity;-><init>()V

.line 21
    iput-object v0, p0, Lcom/example/testproject/MainActivity;->text:Landroid/widget/TextView;

.line 22
    iput-object v0, p0, Lcom/example/testproject/MainActivity;->btn:Landroid/widget/Button;

.line 23
    const/4 v0, 0x0 iput v0, p0, Lcom/example/testproject/MainActivity;->count:I

.line 19
```

FIG. 7

```
▼ Fat Binary
    Fat Header
    ▼ Executable (ARM_V7)
        Mach Header
        ▶ Load Commands
        ▶ Section (__TEXT,__text)
        ▶ Section (__TEXT,__stub_helper)
        ▶ Section (__TEXT,__cstring)
        ▶ Section (__TEXT,__objc_methname)
          Section (__TEXT,__const)
        ▶ Section (__TEXT,__symbolstub1)
        ▶ Section (__DATA,__lazy_symbol)
        ▶ Section (__DATA,__nl_symbol_ptr)
          Section (__DATA,__const)
        ▶ Section (__DATA,__objc_classlist)
        ▶ Section (__DATA,__objc_protolist)
        ▶ Section (__DATA,__objc_imageinfo)
        ▶ Section (__DATA,__objc_const)
        ▶ Section (__DATA,__objc_selrefs)
          Section (__DATA,__objc_protorefs)
        ▶ Section (__DATA,__objc_data)
          Section (__DATA,__data)
        ▶ Dynamic Loader Info
        ▶ Function Starts
        ▶ Symbol Table
        ▶ Data in Code Entries
        ▶ Dynamic Symbol Table
          String Table
```

SERVER AND METHOD FOR CHECKING VULNERABILITY OF MOBILE APPLICATION

CROSS-REFERENCE TO RELATED APPLICATION

This application claims priority to and the benefit of Korean Patent Application No. 2017-0146605, filed on Nov. 6, 2017, the disclosure of which is incorporated herein by reference in its entirety.

BACKGROUND

1. Field of the Invention

The present invention relates to a technology for checking a vulnerability of a mobile application, and more particularly, to a server and method for checking a vulnerability of a mobile application with which function-specific vulnerabilities of an execution file of a mobile application are automatically checked.

2. Discussion of Related Art

In a software development process, vulnerabilities of software are checked by correcting a source code with a source code analysis tool and determining whether the vulnerabilities have been overcome with the source code analysis tool again. On the other hand, in the case of a mobile application, vulnerabilities are checked in an environment in which it is not possible to obtain a source code. Therefore, vulnerabilities are checked in the form of black-box testing in which it is possible to check vulnerabilities with only an execution file. Here, black-box testing is a method of software testing in which analysis is conducted based on input and output values of software assuming that the software is a black box whose internal operation is not observable.

However, such a method of checking vulnerabilities requires that an expert who is able to check vulnerabilities with only an execution file conduct a vulnerability analysis and check vulnerabilities again even after vulnerabilities are corrected.

SUMMARY OF THE INVENTION

The present invention is directed to providing a server and method for checking a vulnerability of a mobile application, the server and method making it possible to detect a major vulnerability of a mobile application and also increase checking efficiency by intensively checking vulnerabilities of the application before release or distribution of the mobile application.

The present invention is directed to providing a server and method for checking a vulnerability of a mobile application, the server and method increasing efficiency by automating and making each test algorithmic so that vulnerabilities may be automatically checked if only a target execution file whose vulnerabilities will be checked is selected.

The present invention is directed to providing a server and method for checking a vulnerability of a mobile application, the server and method facilitating a vulnerability check by causing the vulnerability check to be performed through additional analysis when it is not possible to check vulnerabilities through automatic analysis.

According to an aspect of the present invention, there is provided a method of checking a vulnerability of a mobile application, the method including: (a) receiving a target execution file whose vulnerabilities will be checked and which corresponds to a mobile application to be executed in a mobile terminal; (b) testing vulnerabilities of the target execution file according to a type of an operating system of the target execution file; and (c) generating results of analyzing vulnerabilities of the target execution file on the basis of results of checking vulnerabilities of the target execution file.

Operation (b) may include: (b-1) testing vulnerable authorities of the target execution file; (b-2) testing vulnerable functions of the target execution file; (b-3) testing whether a memory hacking prevention function has been applied to the target execution file; (b-4) testing whether a string of the target execution file has been exposed; (b-5) testing vulnerable symbols of the target execution file; and (b-6) checking vulnerabilities in a library of the target execution file.

Operation (b-1) may include testing whether a preset vulnerable authority is in a file, which is extracted from the target execution file and decoded and defines function of the target execution file, when the operating system of the target execution file corresponds to a first type and testing whether a preset vulnerable authority is in an information file extracted from the target execution file when the operating system of the target execution file corresponds to a second type.

Operation (b-2) may include testing whether a preset vulnerable function is in an assembler code acquired by changing a file containing an execution code of the target execution file when the operating system of the target execution file corresponds to a first type and testing whether a preset vulnerable function is in an execution file of the target execution file when the operating system of the target execution file corresponds to a second type.

Operation (b-3) may include extracting a process identifier (ID) by executing the target execution file and then accessing the target execution file using a function used for process debugging, determining whether the target execution file is executed normally, and determining that the target execution file does not have the memory hacking prevention function when the target execution file is executed normally and determining that the target execution file has the memory hacking prevention function when the target execution file is not executed normally.

The method may further include, after operation (b-3), determining whether a tampering prevention function has been applied to the target execution file when the operating system of the target execution file corresponds to a first type.

The determining of whether a tampering prevention function has been applied to the target execution file may include: modifying a part of a file containing an execution code of the target execution file; executing the target execution file which contains the execution code and whose part has been modified and determining whether the target execution file is installed and executed normally; and determining that the target execution file does not have the tampering prevention function when the target execution file is installed and executed normally and determining that the target execution file has the tampering prevention function when the target execution file is not installed and executed normally.

Operation (b-4) may include: when the operating system of the target execution file corresponds to a first type, changing a Dalvik Executable (DEX) file of the target execution file into an assembler code and testing whether a preregistered inferable string exists in the assembler code, and when the operating system of the target execution file corresponds to a second type, extracting an execution file of the target execution file and testing whether an inferable string exists in the execution file.

Operation (b-5) may include, when the operating system of the target execution file corresponds to a first type, testing whether a preregistered vulnerable symbol exists in the library of the target execution file, and when the operating system of the target execution file corresponds to a second type, extracting an execution file of the target execution file and testing whether a vulnerable symbol exists in the execution file.

Operation (b-6) may include testing whether a preregistered library vulnerability exists in the library extracted from the target execution file.

The method may further include transmitting information on the target execution file and a check list to the mobile terminal and receiving results of monitoring whether a memory of the mobile terminal has been hacked and capture information of network packets from the mobile terminal.

According to another aspect of the present invention, there is provided a server for checking a vulnerability of a mobile application, the server including a file receiver configured to receive a target execution file whose vulnerabilities will be checked and which corresponds to a mobile application to be executed in a mobile terminal, a vulnerability tester configured to test vulnerabilities of the target execution file according to a type of an operating system of the target execution file, and a test result generator configured to generate results of analyzing vulnerabilities of the target execution file based on results of testing vulnerabilities of the target execution file.

The vulnerability tester may include an authority test module configured to test vulnerable authorities of the target execution file, a function test module configured to test vulnerable functions of the target execution file, a memory hacking prevention function test module configured to test whether a memory hacking prevention function has been applied to the target execution file, a string test module configured to test whether a string of the target execution file has been exposed, a symbol test module configured to test vulnerable symbols of the target execution file, and a library test module configured to check vulnerabilities in a library of the target execution file.

The vulnerability tester may further include a tampering prevention function test module configured to test whether a tampering prevention function has been applied to the target execution file when the operating system of the target execution file corresponds to a first type.

The vulnerability tester may include an additional test module configured to transmit information on the target execution file and a check list to the mobile terminal and receive results of monitoring whether a memory of the mobile terminal has been hacked and capture information of network packets from the mobile terminal.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 5 to 8 are example views illustrating function tests;

DETAILED DESCRIPTION OF EXEMPLARY EMBODIMENTS

Figure 1:
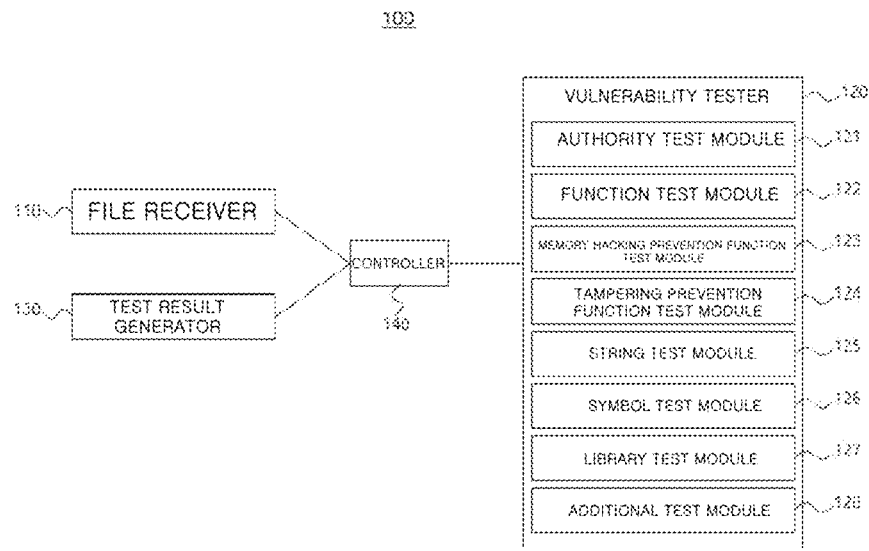
FIG. 1 is a block diagram of a server for checking a vulnerability of a mobile application according to an exemplary embodiment of the present invention.

Advantages and features of the present invention and methods of accomplishing the same will be apparent from the embodiments described in detail below with reference to the accompanying drawings. However, the present invention is not limited to the following disclosed embodiments and will be embodied in many different forms, and these embodiments are only provided to make the disclosure complete and help those of ordinary skill in the technical field pertaining to the present invention to understand the scope of the present invention fully. The present invention is only defined by the scope of the appended claims. Throughout the specification, like reference numbers refer to like elements. The term "and/or" includes any and all combinations of one or more of the associated listed items.

Although the terms "first," "second," etc. may be used to describe various elements, components, and/or sections, these elements, components, and/or sections should not be limited by these terms. These terms are only used to distinguish one element, component, or section from another element, component, or section. Therefore, a first element, component, or section mentioned below may be termed a second element, component, or section without departing from the technical spirit of the present invention.

Identification codes (e.g., a, b, and c) of respective operations are used for convenience of description and do not illustrate a sequence of the steps. Unless a specific sequence is clearly mentioned in the context, respective steps may be performed out of the order noted in a flowchart. In other words, respective steps may be performed in the same order as stated, substantially concurrently, or in the reverse order.

The terminology used herein is for the purpose of describing particular embodiments only and is not intended to be limiting of the invention. As used herein, the singular forms are intended to include the plural forms as well, unless the context clearly indicates otherwise. The terms "comprises" and/or "comprising," when used in this specification, specify the presence of stated components, steps, operations, and/or elements, but do not preclude the presence or addition of one or more other components, steps, operations, and/or elements.

Unless otherwise defined, all terms (including technical and scientific terms) used herein have the same meaning as commonly understood by those of ordinary skill in the art to which the present invention belongs. Also, terms defined in commonly used dictionaries will not be interpreted in an idealized or overly formal sense unless clearly so defined herein.

In describing embodiments of the present invention, when it is determined that a detailed description of a known function or configuration would unnecessarily obscure the gist of the present invention, the detailed description thereof will be omitted. Also, terms described below are defined in consideration of functionality in the present invention, and the definitions thereof may vary depending on intention of a user or an administrator, a practice, or the like. Therefore, the terms should be defined on the basis of the overall content of this specification.

FIG. 1 is a block diagram of a server for checking a vulnerability of a mobile application according to an exemplary embodiment of the present invention.

Referring to FIG. 1, a server 100 for checking a vulnerability of a mobile application includes a file receiver 110, a vulnerability tester 120, a test result generator 130, and a controller 140. The vulnerability tester 120 may include an authority test module 121, a function test module 122, a memory hacking prevention function test module 123, a tampering prevention function test module 124, a string test module 125, a symbol test module 126, a library test module 127, and an additional test module 128. The controller 140 may control operation and data flow of the receiver 110, the vulnerability tester 120, and the test result generator 130.

Figure 2:
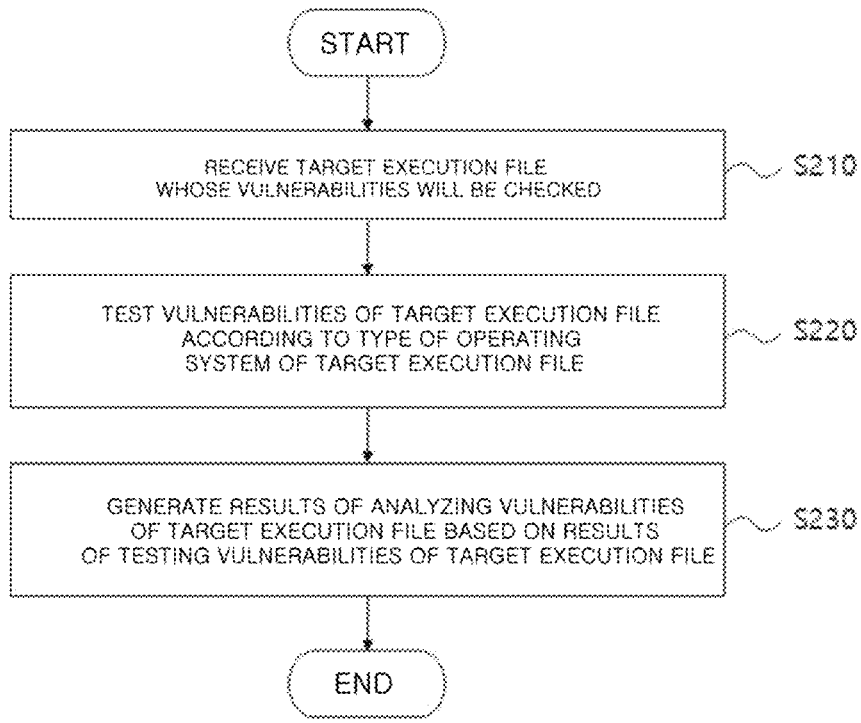
FIG. 2 is a flowchart illustrating a method of checking a vulnerability of a mobile application according to an exemplary embodiment of the present invention.

A vulnerability check method performed by the respective components of the server 100 for checking a vulnerability of a mobile application (referred to as a vulnerability check server 100 below) will be described in detail below with reference to FIG. 2.

The file receiver 110 receives a target execution file whose vulnerabilities will be checked (operation S210). Here, the target execution file corresponds to a mobile application which will be executed in a mobile terminal. The target execution file may be classified as a first type or a second type according to an operating system of a mobile terminal in which the target execution file will be executed. For example, the first type of target execution file may correspond to an Android PacKage (APK) file used in the Android operating system, and the second type of target execution file may correspond to an iOS App Store Package (IPA) file used in the iOS operating system.

A user may transmit a target execution file, whose vulnerabilities will be checked, to the vulnerability check server 100 through a user interface of a user terminal connected to the vulnerability check server 100, and the file receiver 110 may receive the target execution file transmitted from the user terminal. As an example, the user terminal is a computer, such as a desktop personal computer (PC) or a laptop PC. The user terminal may be any kind of wired or wireless communication device which may access the vulnerability check server 100 through a network and perform an operation required to check vulnerabilities of the target execution file. The user terminal may be a smart phone which is based on an open operating system and enables a user to download various application programs that he or she wants and freely use and delete the downloaded programs.

When the target execution file is received through the file receiver 110, a vulnerability check may be automatically performed through the vulnerability tester 120 and the test result generator 130, which will be described below.

The vulnerability tester 120 tests vulnerabilities of the target execution file according to the type of operating system of the target execution file (operation S220). In other words, a test item and a test method may vary according to whether the operating system of the target execution file corresponds to the first type or the second type. The operation of testing vulnerabilities will be described in detail with reference to FIG. 3.

Figure 3:
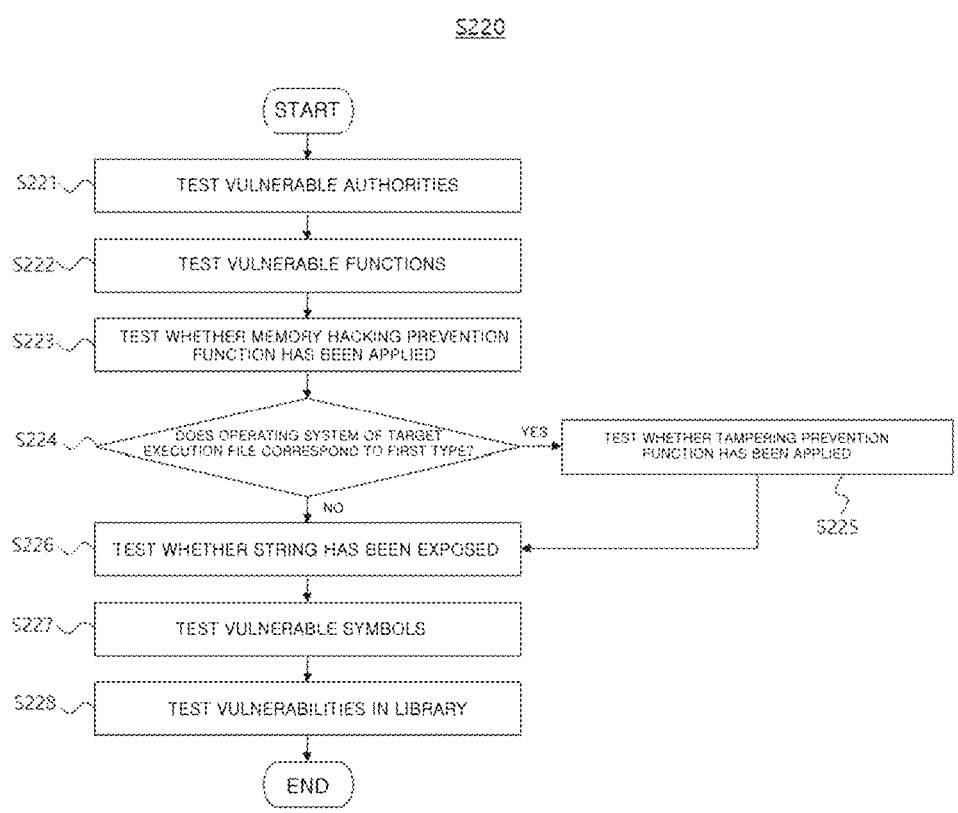
FIG. 3 is a flowchart illustrating in detail a method of testing a vulnerability according to an exemplary embodiment of the present invention.

Referring to FIG. 3, the authority test module 121 tests vulnerable authorities of the target execution file (operation S221). According to an exemplary embodiment, when the operating system of the target execution file corresponds to the first type, the authority test module 121 may decompress the target execution file (e.g., an APK file), extract the file "AndroidMeinfest.xml" from the decompressed target execution file, and decode the extracted file "AndroidMeinfest.xml." Here, the file "AndroidMeinfest.xml" is an Android APK file, that is, a file for defining the overall functionality of the target execution file. Upon developing an Android APK file, each development company designates a unique package name "AndroidMeinfest.xml" for a file, and the package name may correspond to an identifier (ID) for identifying an application. In other words, it is not possible to install APK files having the same package name in one terminal, and it is not possible to upload APK files having the same package name to Google Play Store. Subsequently, the authority test module 121 may test whether a preset vulnerable authority is in the decoded file "AndroidMeinfest.xml."

According to another exemplary embodiment, when the operating system of the target execution file corresponds to the second type, the authority test module 121 may decompress the target execution file (e.g., an IPA file) and extract the file "info.plist" from the decompressed target execution file. Here, the file "info.plist" is an information file held in every iPhone application and stores information required for executing the target execution file. The file "info.plist" is divided into key values for classifying data and values containing actual data, and it is possible to add, delete, and modify data thereof. Subsequently, the authority test module 121 may test whether a preset vulnerable authority is in the file "info.plist."

Vulnerable authorities may be authorities sensitive to personal information and may correspond to, for example, camera, Bluetooth, contact, and location information. Vulnerable authorities may be set or registered by a checker according to the type of operating system before the vulnerability test is performed.

Figure 5:
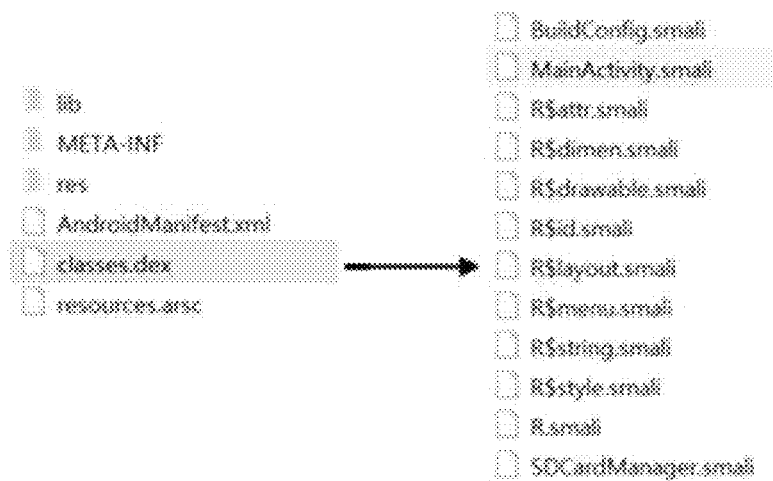

The function test module 122 tests vulnerable functions of the target execution file (operation S222). According to an exemplary embodiment, when the operating system of the target execution file corresponds to the first type, the function test module 122 may extract a Dalvik Executable (DEX) file containing an execution code from the target execution file (e.g., an APK file) and change the extracted DEX file into a small code. For example, as shown in FIG. 5, a DEX file may be changed into a plurality of smali codes. Here, the smali codes correspond to assembler codes used in the first type of operating system (e.g., Android). Subsequently, the function test module 122 may test whether a preset vulnerable function is in the smali codes. For example, functions exist in smali codes as shown in FIG. 6, and thus the function test module 122 may test functions in the small codes.

According to another exemplary embodiment, when the operating system of the target execution file corresponds to the second type, the function test module 122 extracts an execution file (a Mach-O structure) of the target execution file defined in the file "info.plist" from the target execution file (e.g., an TPA file) and extracts a symbol table from the extracted execution file. As shown in FIG. 7, the Mach-O structure includes a symbol table and a string table, and the symbol table includes a function name used in the second type of operating system (e.g., iOS). Subsequently, the function test module 122 may test whether a preset vulnerable function is in the symbol table.

Figure 8:
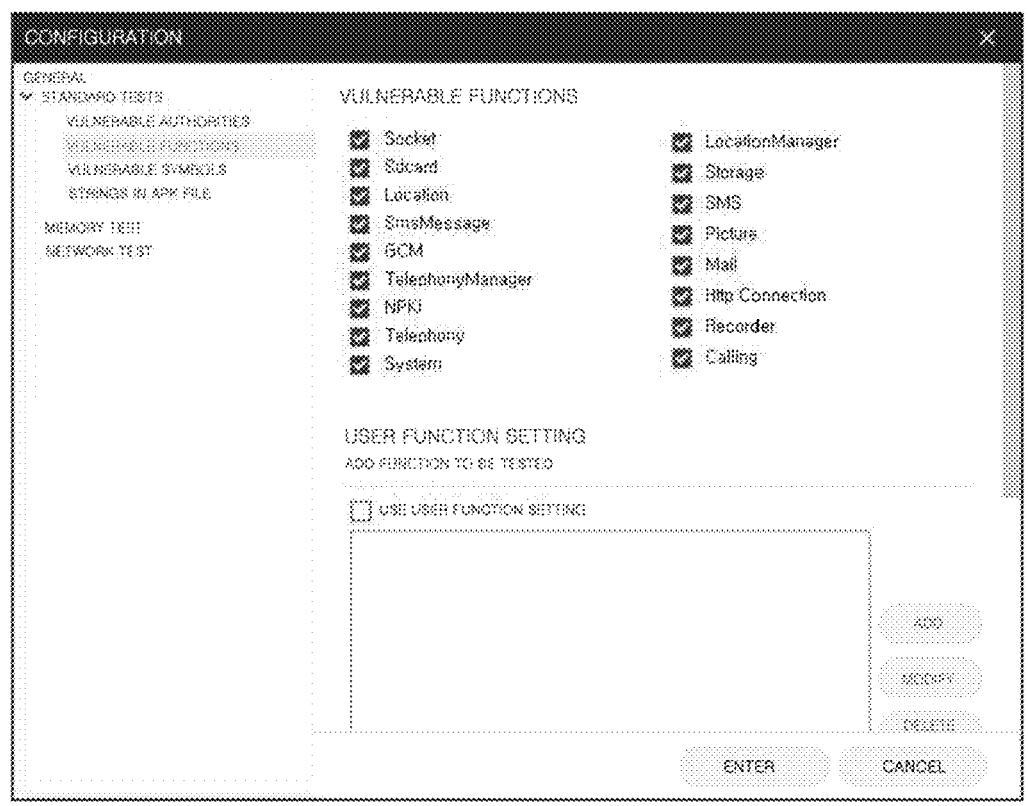

Vulnerable functions are calling functions which may cause a mobile terminal to malfunction. Vulnerable functions may correspond to, for example, "overflow" and "format string" and may be set or registered in advance by a checker depending on the type of operating system. In other words, as shown in FIG. 8, a checker may set "socket," "sdcard," "location," etc. as vulnerable functions in advance.

The memory hacking prevention function test module 123 tests whether a memory hacking prevention function has been applied to the target execution file (operation S223). The memory hacking prevention function test module 123 may extract a process ID by executing the target execution file regardless of the type of operating system of the target execution file and attach to the target execution file using the function "ptrace" which is a function used for process debugging in a Unix/Linux environment. In other words, the function "ptrace" is used to check and manipulate an internal state of the target execution file such that another process may be controlled. An operating system (e.g., Windows) manages a plurality of processes so that the plurality of processes may be independently performed, and a process performed by a user is generally prohibited from attaching to another process which is being performed. In such an environment, the function "ptrace" enables a corresponding process to control another process which is being performed by the operating system. Subsequently, the memory hacking prevention function test module 123 may execute the target execution file again and determine whether the target execution file is executed normally. The memory hacking prevention function test module 123 may determine that the memory hacking prevention function has not been applied to the target execution file when the target execution file is executed normally, and may determine that memory hacking prevention function has been applied to the target execution file when the target execution file is not executed normally.

It is determined whether the operating system of the target execution file corresponds to the first type (operation S224). When the operating system of the target execution file corresponds to the first type, the tampering prevention function test module 124 tests whether a tampering prevention function has been applied to the target execution file (operation S225). In other words, when the operating system of the target execution file corresponds to the second type, it is not determined whether the tampering prevention function has been applied to the target execution file.

The tampering prevention function test module 124 may decompress the target execution file (e.g., an APK file), generate the target execution file again by reversely analyzing the decompressed target execution file, and execute the regenerated target execution file. More specifically, the tampering prevention function test module 124 may perform a reverse analysis process of analyzing the target execution file by debugging the target execution file so that a source code and the like may be modified and regenerating the target execution file by modifying a part of the DEX file, and the tampering prevention function test module 124 may execute the target execution file regenerated through the reverse analysis process. Here, the target execution file whose DEX file is partially modified may be transmitted to the mobile terminal and executed in the mobile terminal or an emulator. After executing the regenerated target execution file, the tampering prevention function test module 124 determines whether the target execution file is installed and executed normally in the mobile terminal or an emulator. The tampering prevention function test module 124 may determine that the target execution file does not have the tampering prevention function when the regenerated target execution file is installed and executed normally, and may determine that the target execution file has the tampering prevention function when the regenerated target execution file is not installed and executed normally.

When it is determined in operation S224 that the operating system of the target execution file does not correspond to the first type and after whether the tampering prevention function has been applied to the target execution file is tested through operation S225, the string test module 125 tests whether a string of the target execution file has been exposed (operation S226).

According to an exemplary embodiment, when the operating system of the target execution file corresponds to the first type, the string test module 125 may extract a DEX file in the target execution file (e.g., an APK file) and change the extracted DEX file into smali codes (i.e., an assembler code) corresponding to debugging codes. Here, the DEX file corresponds to a Dalvik Executable file used in Android. Subsequently, the string test module 125 may test whether a preregistered inferable string exists in the smali code. In the same way, the string test module 125 may also test whether a preregistered inferable string exists in files of the target execution file having the extension "xml" or "dll."

According to another exemplary embodiment, when the operating system of the target execution file corresponds to the second type, the string test module 125 extracts an execution file of the target execution file defined in the file "info.plist" from the target execution file (e.g., an IPA file). After that, the string test module 125 may test whether a preregistered inferable string exists in a string table of the execution file of the string test module 125. Here, the string table corresponds to a set of debugged strings which is used in the second type of operating system (e.g., iOS).

Figure 9:
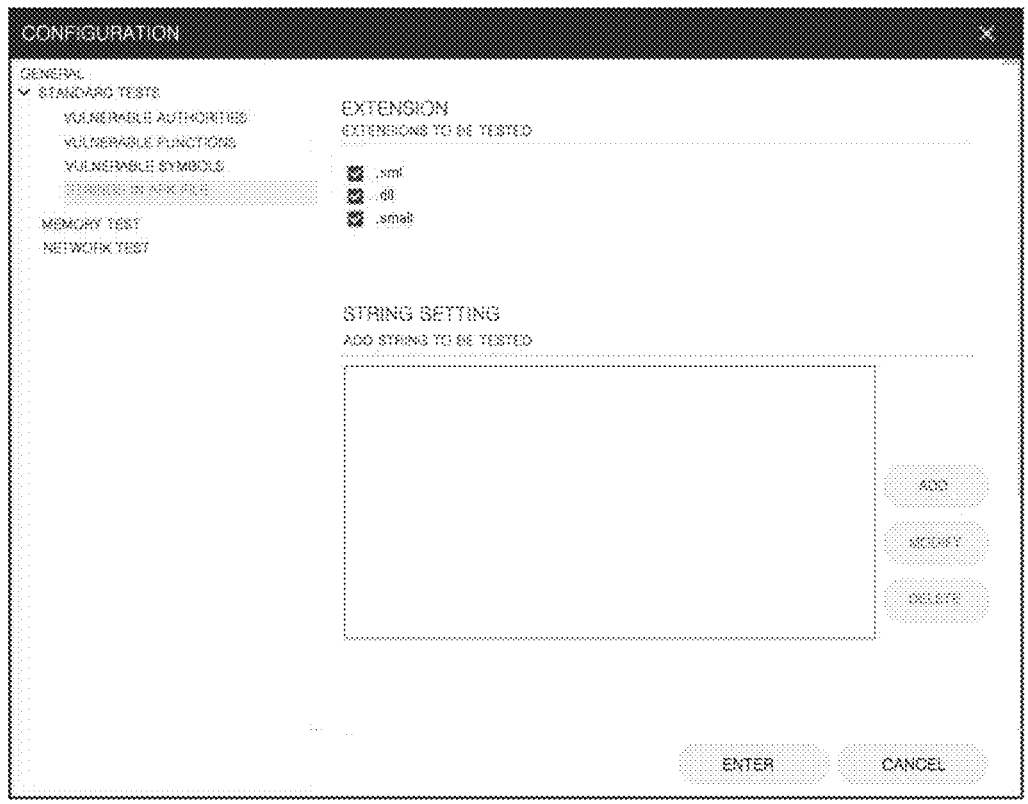
FIG. 9 is an example view illustrating a string test.

The inferable string is a word which may be used for encryption, decryption, a password, or the like and may correspond to, for example, "encrypt," "decrypt," "password," or the like. As shown in FIG. 9, an extension or a string to be tested may be set or registered in advance by a checker depending on the type of operating system.

Figure 10:
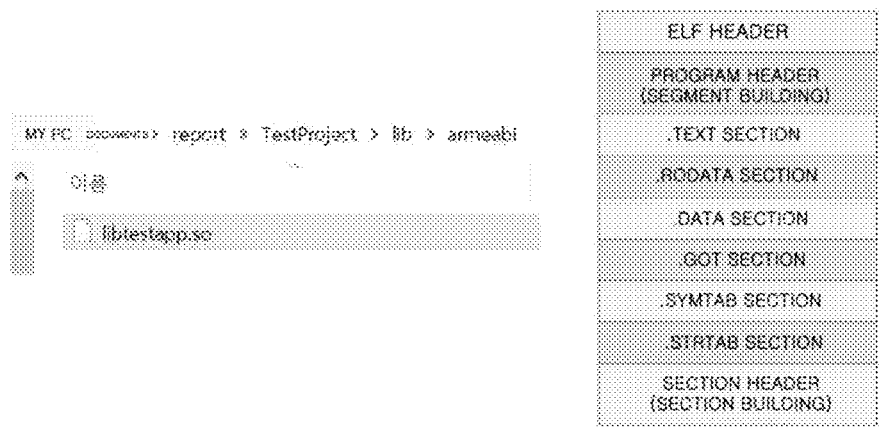
FIGS. 10 and 11 are example views illustrating a symbol test.

The symbol test module 126 tests vulnerable symbols of the target execution file (operation S227). According to an exemplary embodiment, when the operating system of the target execution file corresponds to the first type, the symbol test module 126 may test whether a vulnerable symbol exists in a library of the target execution file (e.g., an APK file). Referring to FIG. 10, in the case of the first type of operating system, a library of an executable and linkable format (ELF) structure is stored under a central processing unit (CPU) name which is under a file having the extension "lib," and a test is conducted to determine whether a vulnerable symbol is a symbol table of the library.

According to another exemplary embodiment, when the operating system of the target execution file corresponds to the second type, the symbol test module 126 extracts an execution file (a Mach-O structure) of the target execution file defined in the file "info.plist" from the target execution file (e.g., an IPA file) and extracts a symbol table from the extracted execution file. Here, the symbol table includes function names used in the second type of operating system (e.g., iOS). After that, the symbol test module 126 may test whether a preset vulnerable symbol is in the symbol table.

Figure 11:
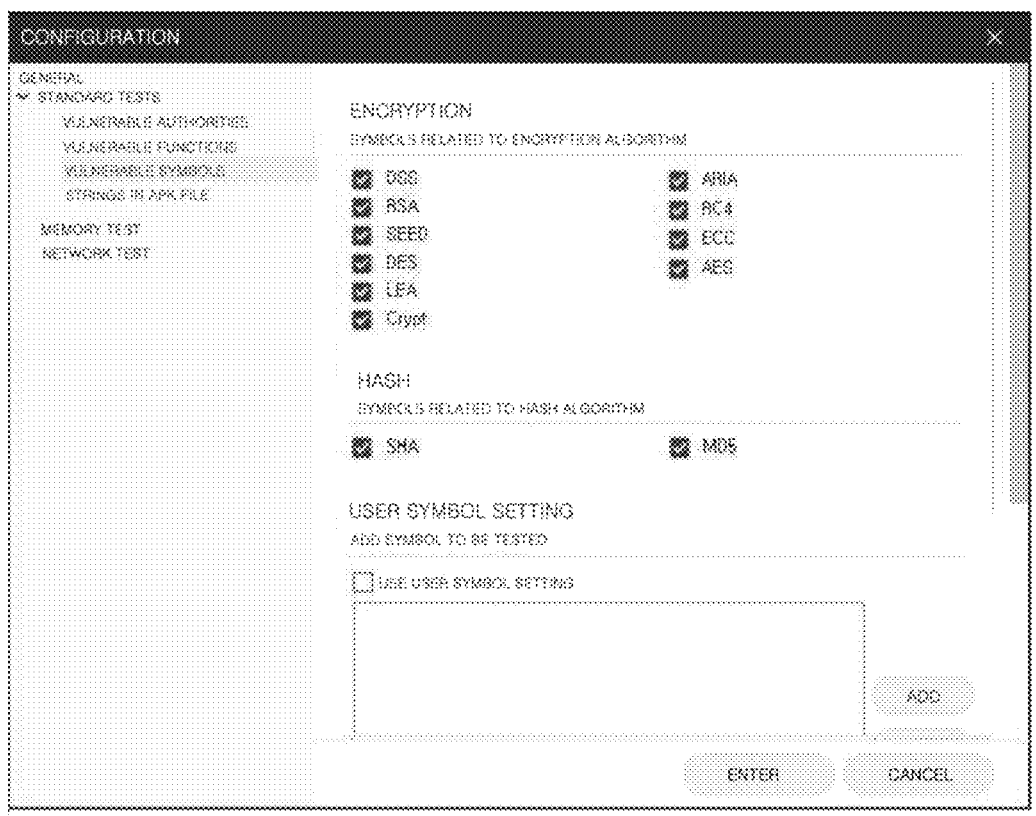

A vulnerable symbol is a word which may be used for encryption, decryption, a password, or the like and may correspond to, for example, "encrypt," "decrypt," "password," or the like. As shown in FIG. 11, vulnerable symbols may be set or registered in advance by a checker depending on the type of operating system. Also, a vulnerable symbol may correspond to a name of a debugged function which is used in the second type of operating system (e.g., iOS).

The library test module 127 tests vulnerabilities in the library of the target execution file (operation S228). When the operating system of the target execution file corresponds to the first type, the library test module 127 may decompress the target execution file (e.g., an APK file). When the operating system of the target execution file corresponds to the second type, the library test module 127 may decompress the target execution file (e.g., an IPA file). After that, the library test module 127 may extract a library file from the decompressed target execution file and test whether a pre-registered library vulnerability exists in the extracted library file. Here, library vulnerabilities indicate functions which may cause a mobile terminal to malfunction among functions which are used by the target execution file through an external file. Library vulnerabilities may be registered by a checker before the vulnerability test is performed and may be registered differently depending on the type of operating system.

Figure 4:
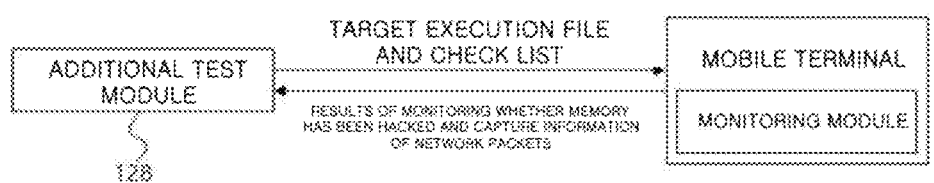
FIG. 4 is a diagram illustrating an additional test method according to an exemplary embodiment of the present invention.

According to an exemplary embodiment, the additional test module 128 additionally tests the target execution file. In other words, while the target execution file is directly executed, a test is performed in addition to the automatic tests of operations S221 to S228 regardless of the type of operating system of the target execution file. Referring to FIG. 4, the additional test module 128 transmits the target execution file and a check list of items to be checked after the target execution file is installed to the mobile terminal. Here, the check list corresponds to an algorithm of the vulnerability check process described through operations S221 to S228 of FIG. 3. The vulnerability tests of operations S221 to S228 are performed while the target execution file is directly executed.

Figure 12:
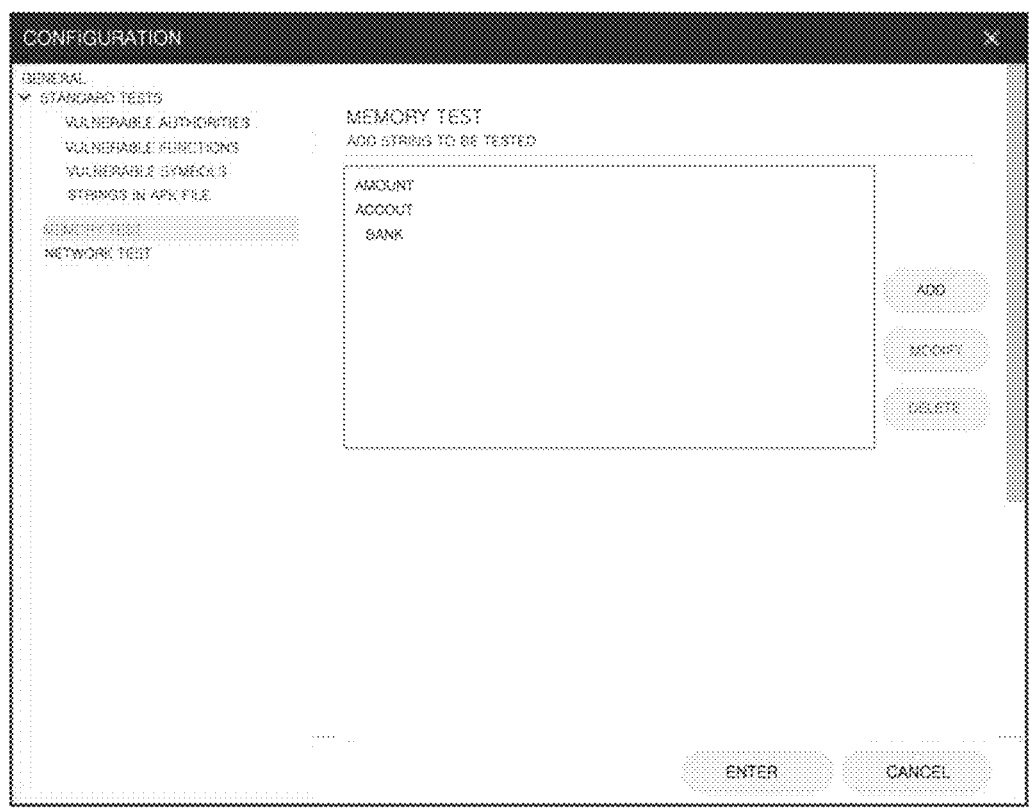
FIG. 12 is an example view illustrating an additional test.

The mobile terminal installs the target execution file received from the additional test module 128, monitors whether the memory has been hacked using a monitoring module provided therein according to the check list, and captures network packets. Here, monitoring whether a memory has been hacked is the same as operation S223 of FIG. 3 in which a test is conducted to determine whether the memory hacking prevention function has been applied to the target execution file. In other words, the operation described with reference to operation S223 is performed through the monitoring module in the mobile terminal. For example, a string which will be tested when a test is conducted to determine whether the memory has been hacked may be set or registered in advance by a checker, as shown in FIG. 12. After that, the mobile terminal may transmit results of monitoring whether the memory has been hacked and capture information of the network packets to the additional test module 128. The additional test module 128 may extract content from the capture information of the network packets received from the mobile terminal, generate a dump file from the content, and test strings of a non-encrypted part of the dump file.

The test result generator 130 generates results of analyzing vulnerabilities of the target execution file on the basis of results of testing vulnerabilities of the target execution file (operation S230). The test result generator 130 may generate vulnerability analysis results by integrating results of a test performed by each module, for example, results of testing whether a vulnerable authority exists, whether a vulnerable function exists, and the like.

Meanwhile, the method of checking a vulnerability of a mobile application according to an exemplary embodiment of the present invention may be implemented as a computer-readable code on a computer-readable recording medium. The computer-readable recording medium includes any kind of recording device for storing data which may be read by a computer system.

For example, the computer-readable recording medium may be a read-only memory (ROM), a random access memory (RAM), a compact disc read-only memory (CD-ROM), a magnetic tape, a hard disc, a floppy disc, a portable storage device, a non-volatile memory (a flash memory), an optical data storage device, and the like.

Also, the computer-readable recording medium may be distributed to computer systems connected via a computer network and stored and executed as a code which may be read in a distributed manner.

According to exemplary embodiments of the present invention, before release or distribution of a mobile application, vulnerabilities of the application are intensively checked, and thus it is possible to directly identify and cope with vulnerabilities of the mobile application. Also, the time and cost required for managing and detecting vulnerabilities are reduced, and thus it is possible to increase efficiency in vulnerability management.

The above description of the present invention is for illustrative purposes, and those of ordinary skill in the art to which the present invention pertains will appreciate that other specific modifications can be easily made without departing from the technical spirit or essential features of the invention. Therefore, the above exemplary embodiments should be considered as illustrative rather than limiting in all aspects. The scope of the invention is defined by the following claims, and all changes and modifications obtained from the meaning and range of claims and equivalent concepts should be construed as being included in the scope of the present invention.

What is claimed is:

1. A method of checking a vulnerability of a mobile application, the method comprising:
   (a) receiving a target execution file whose vulnerabilities will be checked and which corresponds to a mobile application to be executed in a mobile terminal;
   (b) testing vulnerabilities of the target execution file according to a type of operating system of the target execution file; and
   (c) generating results of analyzing vulnerabilities of the target execution file based on results of checking vulnerabilities of the target execution file,
   wherein the target execution file is an Android package (APK) file if the operation system is Android operation system and the target execution file is an iOS App Store Package (IPA) file if the operation system is iOS operation system,
   wherein operation (b) comprises (b-3) testing whether a memory hacking prevention function has been applied to the target execution file, and
   wherein operation (b-3) comprises:
      extracting a process identifier (ID) by executing the target execution file and then accessing the target execution file using a function used for process debugging;
      determining whether the target execution file is executed normally; and determining that the target execution file does not have the memory hacking prevention function when the target execution file is executed normally and determining that the target execution file has the memory hacking prevention function when the target execution file is not executed normally.

2. The method of claim 1, wherein operation (b) comprises:
 (b-1) testing vulnerable authorities of the target execution file;
 (b-2) testing vulnerable functions of the target execution file;
 (b-4) testing whether a string of the target execution file has been exposed;
 (b-5) testing vulnerable symbols of the target execution file; and
 (b-6) checking vulnerabilities in a library of the target execution file.

3. The method of claim 2, wherein operation (b-1) comprises
 testing whether a preset vulnerable authority is in a file, which is extracted from the target execution file and decoded and defines functions of the target execution file, when the operating system of the target execution file corresponds to a first type, and
 testing whether a preset vulnerable authority is in an information file extracted from the target execution file when the operating system of the target execution file corresponds to a second type.

4. The method of claim 2, wherein operation (b-2) comprises
 testing whether a preset vulnerable function is in an assembler code acquired by changing a file containing an execution code of the target execution file when the operating system of the target execution file corresponds to a first type, and
 testing whether a preset vulnerable function is in an execution file of the target execution file when the operating system of the target execution file corresponds to a second type.

5. The method of claim 1, further comprising, after operation (b-3), determining whether a tampering prevention function has been applied to the target execution file when the operating system of the target execution file corresponds to a first type.

6. The method of claim 5, wherein the determining of whether a tampering prevention function has been applied to the target execution file comprises:
 modifying a part of a file containing an execution code of the target execution file;
 executing the target execution file which contains the execution code and whose part has been modified and determining whether the target execution file is installed and executed normally; and
 determining that the target execution file does not have the tampering prevention function when the target execution file is installed and executed normally and determining that the target execution file has the tampering prevention function when the target execution file is not installed and executed normally.

7. The method of claim 2, wherein operation (b-4) comprises
 when the operating system of the target execution file corresponds to a first type, changing a Dalvik Executable (DEX) file of the target execution file into an assembler code and testing whether a preregistered inferable string exists in the assembler code, and
 when the operating system of the target execution file corresponds to a second type, extracting an execution file of the target execution file and testing whether an inferable string exists in the execution file.

8. The method of claim 2, wherein operation (b-5) comprises
 when the operating system of the target execution file corresponds to a first type, testing whether a preregistered vulnerable symbol exists in the library of the target execution file, and
 when the operating system of the target execution file corresponds to a second type, extracting an execution file of the target execution file and testing whether a vulnerable symbol exists in the execution file.

9. The method of claim 2, wherein operation (b-6) comprises testing whether a preregistered library vulnerability exists in the library extracted from the target execution file.

10. The method of claim 2, further comprising:
 transmitting information on the target execution file and a check list to the mobile terminal; and
 receiving results of monitoring whether a memory of the mobile terminal has been hacked and capture information of network packets from the mobile terminal.

11. A computer-readable recording medium storing a program for causing a computer to perform the method of claim 1.

* * * * *